United States Patent
Park et al.

(10) Patent No.: US 9,726,934 B2
(45) Date of Patent: Aug. 8, 2017

(54) DISPLAY DEVICE AND METHOD OF MANUFACTURING THE SAME

(71) Applicant: Samsung Display Co., Ltd., Yongin (KR)

(72) Inventors: Joon-Hyung Park, Seoul (KR);
Keunchan Oh, Cheonan-si (KR);
Min-Jae Kim, Suwon-si (KR);
Min-Hee Kim, Ansan-si (KR);
Kangseob Jeong, Seongnam-si (KR);
Kyungseon Tak, Hwaseong-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 97 days.

(21) Appl. No.: 14/458,907

(22) Filed: Aug. 13, 2014

(65) Prior Publication Data

US 2015/0198847 A1  Jul. 16, 2015

(30) Foreign Application Priority Data

Jan. 10, 2014  (KR) .................. 10-2014-0003495

(51) Int. Cl.
*C09K 19/12* (2006.01)
*C09K 19/52* (2006.01)
(Continued)

(52) U.S. Cl.
CPC ........ *G02F 1/133723* (2013.01); *C09K 19/12* (2013.01); *C09K 19/3001* (2013.01); *C09K 19/3003* (2013.01); *G02F 1/133788* (2013.01); *C09K 2019/0448* (2013.01); *C09K 2019/122* (2013.01); *C09K 2019/123* (2013.01); *C09K 2019/124* (2013.01); *C09K 2019/301* (2013.01);
(Continued)

(58) Field of Classification Search
CPC ......... G02F 1/133723; G02F 1/133788; G02F 1/133742; G02F 2001/13712; G02F 2001/133726; C09K 19/12; C09K 19/3001; C09K 19/3004; C09K 2019/3004; C09K 2019/301; C09K 2019/3016; C09K 2019/122; C09K 2019/123; C09K 2019/124; C09K 2019/0448
See application file for complete search history.

(56) References Cited

U.S. PATENT DOCUMENTS 5,965,060 A  10/1999 Tarumi et al.
6,066,268 A  5/2000 Ichinose et al.
(Continued)

FOREIGN PATENT DOCUMENTS

JP  2006-502264  1/2006
JP  2013-006978  1/2013
(Continued)

OTHER PUBLICATIONS

CAPLUS 2009:769252.*

*Primary Examiner* — Shean C Wu
(74) *Attorney, Agent, or Firm* — H.C. Park & Associates, PLC

(57) ABSTRACT

A display device including a first substrate, a second substrate facing the first substrate, and a liquid crystal layer provided between the first substrate and the second substrate. The liquid crystal layer has a value of rotation viscosity (γ1)/bending modulus of elasticity (K33) of about 6.0 to about 6.4 mPa*s/pN.

18 Claims, 5 Drawing Sheets

(51) Int. Cl.
  *G02F 1/1337* (2006.01)
  *C09K 19/30* (2006.01)
  *C09K 19/04* (2006.01)

(52) U.S. Cl.
  CPC .......... *C09K 2019/3004* (2013.01); *C09K 2019/3016* (2013.01); *G02F 2001/133726* (2013.01)

(56) References Cited

U.S. PATENT DOCUMENTS

| | | | |
|---|---|---|---|
| 6,497,828 | B1 | 12/2002 | Hirschmann et al. |
| 7,643,124 | B2 | 1/2010 | Pai et al. |
| 7,731,865 | B2 | 6/2010 | Bernatz et al. |
| 7,875,326 | B2 | 1/2011 | Lee et al. |
| 8,003,007 | B2 * | 8/2011 | Hong .................... C09K 19/12 252/299.01 |
| 8,114,310 | B2 | 2/2012 | Bernatz et al. |
| 2009/0103011 | A1 | 4/2009 | Bernatz et al. |
| 2009/0324853 | A1 | 12/2009 | Bernatz et al. |
| 2010/0066932 | A1* | 3/2010 | Huh .................... C09K 19/3402 349/38 |
| 2010/0225841 | A1* | 9/2010 | Park ....................... C09K 19/30 349/48 |
| 2010/0302491 | A1 | 12/2010 | Usui et al. |
| 2012/0241671 | A1 | 9/2012 | Hattori et al. |
| 2013/0183460 | A1* | 7/2013 | Klasen-Memmer . C09K 19/062 428/1.4 |
| 2014/0204329 | A1 | 7/2014 | Bae et al. |

FOREIGN PATENT DOCUMENTS

| | | |
|---|---|---|
| JP | 2013-144739 | 7/2013 |
| KR | 10-2012-0094019 | 8/2012 |
| KR | 10-2013-0038956 | 4/2013 |
| KR | 10-2014-0095326 | 8/2014 |
| KR | 10-2015-0063804 | 6/2015 |

\* cited by examiner

DISPLAY DEVICE AND METHOD OF MANUFACTURING THE SAME

CROSS-REFERENCE TO RELATED APPLICATION

This application claims priority under 35 U.S.C. §119 of Korean Patent Application No. 10-2014-0003495, filed on Jan. 10, 2014, which is hereby incorporated by reference for all purposes as if fully set forth herein.

BACKGROUND

Field

The present disclosure herein relates to a display device and a method of manufacturing the same, and more particularly, to a display device in which the response time of liquid crystal is improved and a method of manufacturing the same.

Discussion of the Background

Generally, display devices are classified as a twisted nematic mode display device, an in-plane switching mode display device, or a vertical alignment mode display device. In the vertical alignment mode display device, the longitudinal axes of the liquid crystal molecules are vertically aligned with respect to a substrate when an electric field is not applied. Thus, the viewing angle is wide and the contrast ratio is large.

To align liquid crystal molecules in a certain direction, a rubbing method or a photo-aligning method may be used. In the vertical alignment mode display device, a reactive mesogen may be used to align the liquid crystal molecules using the photo-aligning method. The reactive mesogen may be included in a liquid crystal layer in an uncured state and may be cured through exposure to light, to align the liquid crystal molecules.

The above information disclosed in this Background section is only for enhancement of understanding of the invention and, therefore, it may contain information that does not constitute prior art

SUMMARY

The present disclosure provides a display device providing high quality images in which the transformation of liquid crystal may be prevented, and the response time of the liquid crystal may be improved.

The present disclosure also provides a method of manufacturing the display device.

Additional features of the invention will be set forth in the description which follows, and in part will be apparent from the description, or may be learned by practice of the invention.

Embodiments of the inventive concept provide display devices including a first substrate, a second substrate facing the first substrate, and a liquid crystal layer provided between the first substrate and the second substrate. The liquid crystal layer has a value of rotation viscosity ($\gamma 1$)/bending modulus of elasticity (K33) of about 6.0 to about 6.4 mPa*s/pN.

In other embodiments of the inventive concept, methods of manufacturing a display device include forming a first substrate, forming a second substrate, forming a liquid crystal composition including alkenyl-based liquid crystal molecules, alkoxy-based liquid crystal molecules, quaterphenyl-based liquid crystal molecules, and a reactive mesogen, between the first substrate and the second substrate, and forming a first alignment forming layer and a second alignment forming layer respectively on the first substrate and the second substrate by providing light to the liquid crystal composition. The liquid crystal layer has a value of rotation viscosity ($\gamma 1$)/bending modulus of elasticity (K33) of about 6.0 to about 6.4 mPa*s/pN.

In a display device according to an embodiment of the inventive concept, the transformation of liquid crystal may be prevented. Thus, the decrease of a voltage holding ratio of a pixel may be prevented, and defects that may be possibly generated due to the transformation of the liquid crystal, such as stains, line afterimages, plane afterimages, etc. may be decreased or removed. In addition, the response time of the liquid crystal may be improved.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

The accompanying drawings are included to provide a further understanding of the inventive concept, and are incorporated in and constitute a part of this specification. The drawings illustrate exemplary embodiments of the inventive concept and, together with the description, serve to explain principles of the inventive concept.

DETAILED DESCRIPTION OF THE ILLUSTRATED EMBODIMENTS

Figure 1:
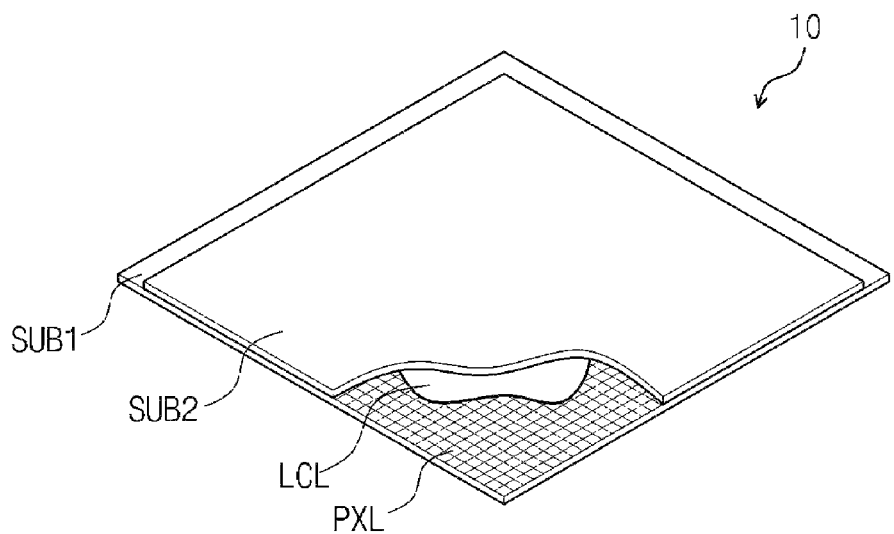
FIG. 1 is a schematic perspective view of a display device according to an embodiment of the inventive concept.

The advantages, other advantages and the features of the inventive concept will be described in example embodiments below with reference to the accompanying drawings. The inventive concept may, however, be embodied in different forms and should not be construed as limited to the embodiments set forth herein. Rather, these embodiments are provided so that this description will be thorough and complete, and will fully convey the scope of the present inventive concept to those skilled in the art.

In the drawings, the dimensions of layers and regions are exaggerated for clarity of illustration. Like reference numerals refer to like elements throughout. It will also be understood that when a layer, a film, a region, or a plate is referred to as being 'on' another layer, film, region, or plate, it can be directly on the other part, or intervening parts may also be present.

It will be understood that when an element or layer is referred to as being "on" or "connected to" another element or layer, it can be directly on or directly connected to the other element or layer, or intervening elements or layers may be present. In contrast, when an element is referred to as being "directly on" or "directly connected to" another element or layer, there are no intervening elements or layers present. It will be understood that for the purposes of this disclosure, "at least one of X, Y, and Z" can be construed as X only, Y only, Z only, or any combination of two or more items X, Y, and Z (e.g., XYZ, XYY, YZ, ZZ).

Figure 2:
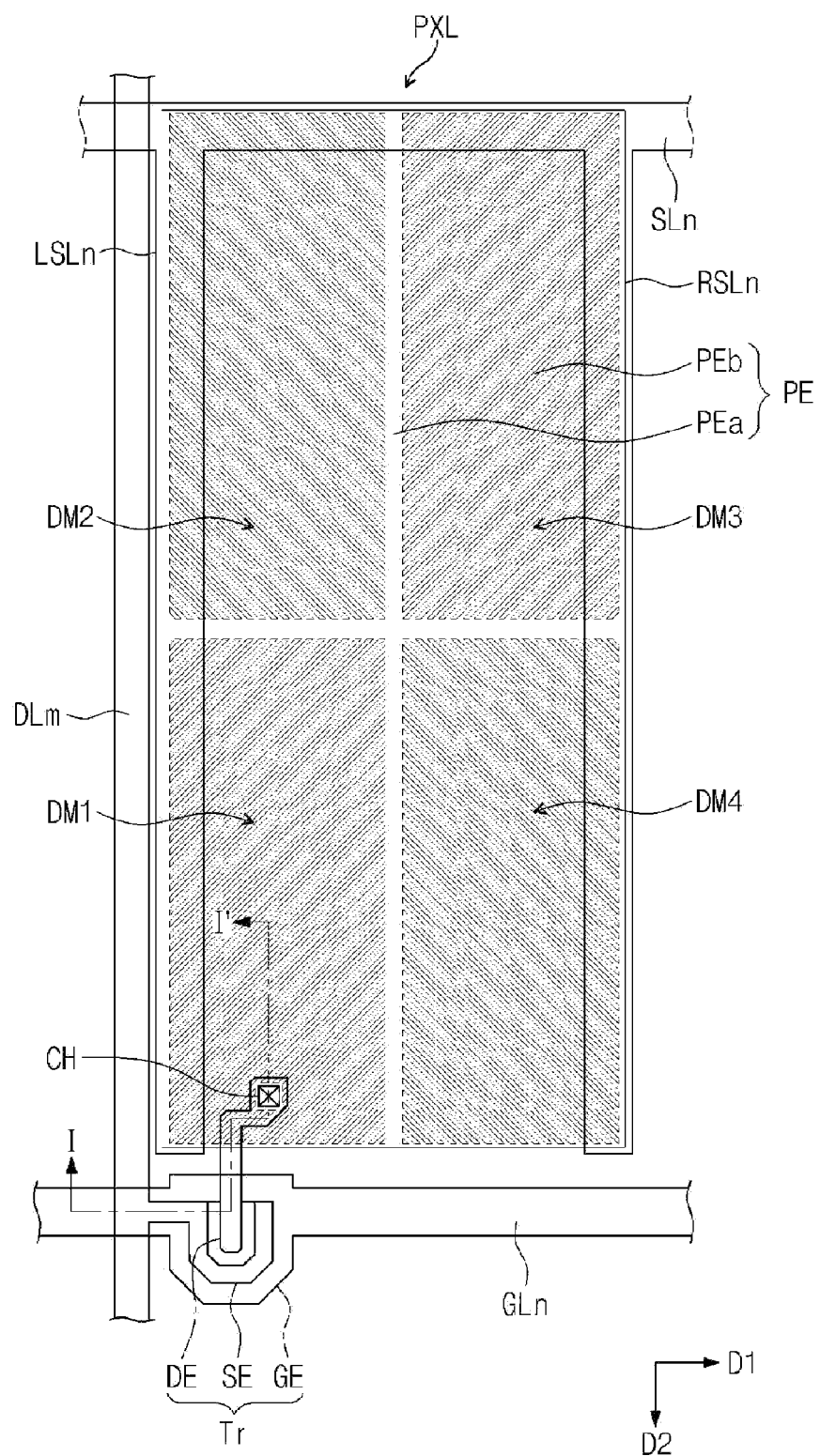
FIG. 2 is a plan view illustrating a portion of a display device including a plurality of pixels, according to an embodiment of the inventive concept.
Figure 3:
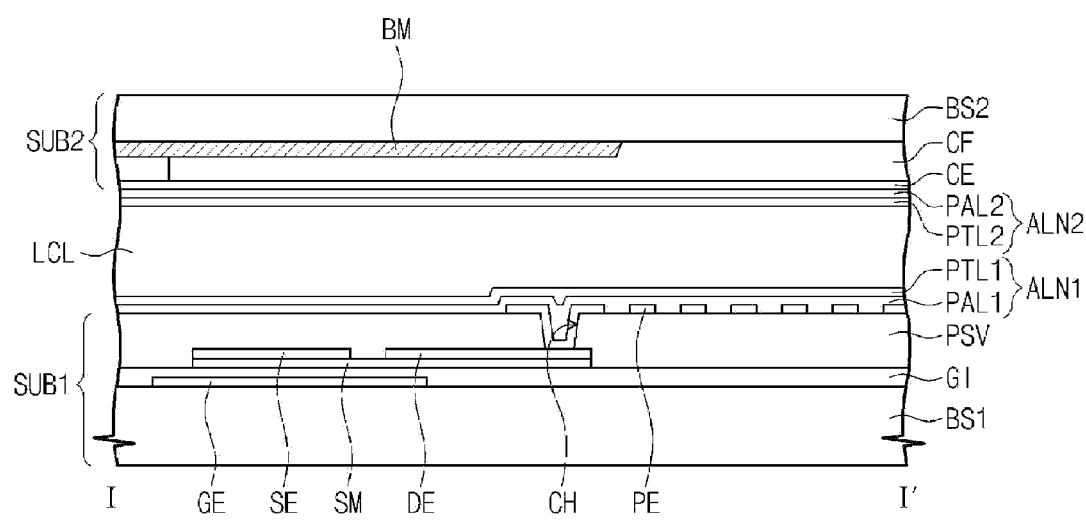
FIG. 3 is a cross-sectional view taken along line I-I' of FIG. 2.

FIG. 1 is a schematic perspective view of a display device according to an embodiment of the inventive concept. FIG. 2 is a plan view illustrating a portion of a display device including a plurality of pixels according to an embodiment of the inventive concept. FIG. 3 is a cross-sectional view taken along line I-I' in FIG. 2.

Referring to FIGS. 1 to 3, a display device 10 includes a first substrate SUB1, a first alignment layer ALN1 provided on the first substrate SUB1, a second substrate SUB2 facing the first substrate SUB1, a second alignment layer ALN2 provided on the second substrate SUB2, and a liquid crystal layer LCL formed between the first alignment layer ALN1 and the second alignment layer ALN2.

The first substrate SUB1 includes a first base substrate BS1, a plurality of gate lines GLn, a plurality of data lines DLm, and a plurality of pixels PXL. For convenience of explanation, an n-th gate line GLn among the gate lines and an m-th data line DLm among the data lines are shown together in a pixel in FIG. 2. In the liquid crystal display device 10 according to an embodiment of the inventive concept, the remaining pixels may have similar structure as that in FIG. 2, and hereinafter, the n-th gate line GLn and the m-th data line DLm will be referred to as a gate line and a data line, respectively.

The first base substrate BS1 has an approximately tetragonal shape and is formed using a transparent insulating material. The gate line GLn is extended in a first direction D1 and is formed on the first base substrate BS1. The data line DLm is extended in a second direction D2 crossing the first direction D1 and is separated from the gate line GLn with a gate insulating layer GI disposed therebetween. The gate insulating layer GI is provided on the entire surface of the first base substrate BS1 and covers the gate line GLn.

Each of the pixels PXL is connected to a corresponding gate line GLn and a corresponding data line DLm. Each of the pixels PXL includes a thin film transistor Tr, a pixel electrode PE connected to the thin film transistor Tr, and a storage electrode. The thin film transistor Tr includes a gate electrode GE, a gate insulating layer GI, a semiconductor pattern PM, a source electrode SE, and a drain electrode DE. The storage electrode includes a storage line SLn extended in the first direction D1, and first and second branch electrodes LSLn and RSLn extended in the second direction D2 from the storage line SLn.

The gate electrode GE may extend from the gate line GLn or may be a portion of the gate line GLn. The gate electrode GE may be formed by using a metal. The gate electrode GE may be formed by using nickel, chromium, molybdenum, aluminum, titanium, copper, tungsten, and alloys thereof. The gate electrode GE may be formed as a single layer or a multi-layer by using one or more of the metals. For example, the gate electrode GE may be a triple layer formed by stacking molybdenum, aluminum and molybdenum layers one by one, or may be a double layer formed by stacking titanium and copper layers. Alternatively, the gate electrode GE may be a single layer formed by using an alloy of titanium and copper.

The semiconductor pattern SM is provided on the gate insulating layer GI. The semiconductor pattern SM is provided on the gate electrode GE with the gate insulating layer GI therebetween. A portion of the semiconductor layer SM is overlapped with the gate electrode GE. The semiconductor pattern SM includes an active pattern (not shown) provided on the gate insulating layer GI, and an ohmic contact layer (not shown) formed on the active pattern. The active pattern may be an amorphous silicon thin film. The ohmic contact layer may be an $n^+$ amorphous silicon thin film. The ohmic contact layer may improve ohmic contact between the active pattern and the source electrode SE and the drain electrode DE.

The source electrode SE is branched from the data line DLm. The source electrode SE is formed on the ohmic contact layer, and a portion thereof is overlapped with the gate electrode GE.

The drain electrode DE is separated from the source electrode SE with the semiconductor pattern SM therebetween. The drain electrode DE is formed on the ohmic contact layer, and a portion thereof is overlapped with the gate electrode GE.

The source electrode SE and the drain electrode DE may be formed by using nickel, chromium, molybdenum, aluminum, titanium, copper, tungsten, and alloys thereof. The source electrode SE and the drain electrode DE may be formed as a single layer or a multi-layer using one or more of the metals. For example, the source electrode SE and the drain electrode DE may be a double layer formed by stacking titanium and copper layers. Alternatively, the source electrode SE and the drain electrode DE may be a single layer formed by using an alloy of titanium and copper.

The top surface of the active pattern between the source electrode SE and the drain electrode DE may be exposed and may form a conductive channel between the source electrode SE and the drain electrode DE, according to the voltage application of the gate electrode GE. The source electrode SE and the drain electrode DE may be overlapped with a portion of the semiconductor pattern SM other than the channel part, between the source electrode SE and the drain electrode DE.

The pixel electrode PE is connected to the drain electrode DE with a passivation layer PSV therebetween. The pixel electrode PE is partially overlapped with the storage line SLn and the first and second branch electrodes LSLn and RSLn, to form a storage capacitor.

The passivation layer PSV covers the source electrode SE, the drain electrode DE, the channel part and the gate insulating layer GI, and includes a contact hole CH exposing a portion of the drain electrode DE. The passivation layer PSV may include, for example, silicon nitride or silicon oxide.

The pixel electrode PE is connected to the drain electrode DE through the contact hole CH formed in the passivation layer PSV. The pixel electrode PE may include a stem PEa, and a plurality of branches PEb that radially extend from the stem PEa. The stem PEa or a portion of the branches PEb are connected to the drain electrode DE through the contact hole CH.

The stem part PEa may be provided in various shapes, and may be provided as a cross shape as in an embodiment of the inventive concept. In this case, the pixel PXL may be divided into a plurality of domains by the stem part PEa. Each of the branches PEb corresponds to each domain, and each domain may be extended in different directions from each other. In an embodiment of the inventive concept, the pixel includes first to fourth domains DM1, DM2, DM3, and DM4. The branches PEb are separated from each other so that adjacent branches PEb may not meet, and are extended in parallel to each other within the divided area by the stem PEa. In the branches PEb, adjacent branches PEb are separated by a micrometer unit to align liquid crystal molecules in the liquid crystal layer LCL at a certain angle, with respect to a plane parallel to the base substrate.

The pixel electrode PE is formed by using a transparent conductive material. Particularly, the pixel electrode PE is formed by using a transparent conductive oxide. The transparent conductive oxide may include indium tin oxide (ITO), indium zinc oxide (IZO), indium tin zinc oxide (ITZO), and the like.

The first alignment layer ALN1 is provided for pre-tilting the liquid crystal molecules of the liquid crystal layer LCL and is disposed on the pixel electrode PE. The first alignment layer ALN1 includes a first primary alignment layer PAL1 provided on the pixel electrode PE, and a first alignment forming layer PTL1 provided on the first primary alignment layer PAL1.

The first alignment layer PAL1 may be formed by using a polymer such as polyimide or polyamic acid. The first primary alignment layer PAL1 may be primarily aligned by using a rubbing method or a photo-aligning method.

The first alignment forming layer PTL1 includes a polymerized reactive mesogen and operates to pre-tilt the liquid crystal molecules in the first alignment layer ALN1. The "reactive mesogen" refers to photo-curing particles, that is, a photo-crosslinkable low molecular weight copolymer or a photo-crosslinkable high molecular weight copolymer, and makes a chemical reaction such as a polymerization reaction when light having a certain wavelength, such as ultraviolet, is applied. The reactive mesogen will be described in more detail herein below.

The first primary alignment layer PAL1 and the first alignment forming layer PTL1 may include areas correspondingly aligned to the first to fourth domains DM1, DM2, DM3, and DM4 of the pixel electrode PE. In an embodiment of the inventive concept, first to fourth areas may be included, and the liquid crystal molecules in the domains DM1, DM2, DM3, and DM4 corresponding to the first to fourth areas may be aligned in different directions.

The second substrate SUB2 includes a second insulating substrate INS2, a color filter CF and a black matrix BM. The color filter CF is formed on the second base substrate BS2 and provides color to the light transmitted through the liquid crystal layer LCL. In an embodiment of the inventive concept, the color filter CF is formed on the second substrate SUB2. However, in some embodiments the color filter CF may be provided on the first substrate SUB1.

The black matrix BM is formed so as to correspond to the shielding area of an array substrate. The shielding area may be defined as an area on which the data line DLm, the thin film transistor Tr and the gate line GLn are formed. Generally, in the shielding area, a pixel electrode PE is not formed, and liquid crystal molecules are not aligned, thereby generating light leakage. The black matrix BM is formed in the shielding area and blocks the light leakage.

The common electrode CE is formed on the color filter CF and forms an electric field with the pixel electrode PE, thereby driving the liquid crystal layer LCL. The common electrode CE may be formed by using a transparent conductive material. The common electrode CE may be formed by using a conductive metal oxide such as ITO, IZO, ITZO, etc.

The second alignment layer ALN2 is provided for pre-tilting the liquid crystal molecules of the liquid crystal layer LCL and is provided on the common electrode CE. The second alignment layer ALN2 includes a second primary alignment layer PAL2 provided on the common electrode CE, and a second alignment forming layer PTL2 provided on the second primary alignment layer PAL2. The second alignment forming layer PTL2 may be the same material as the first alignment forming layer PTL1, or maybe be a different material from the first alignment forming layer PTL1.

In an embodiment of the inventive concept, the first alignment layer ALN1 and the second alignment layer ALN2 may be formed so as to include the primary alignment layer and the alignment forming layer, however, other configurations are possible. The first alignment layer ALN1 and/or the second alignment layer ALN2 may be formed as a common single layer. Between the first substrate SUB1 and the second substrate SUB2, the liquid crystal layer LCL including the liquid crystal molecules is provided.

The elastic energy density of the liquid crystal molecules included in the liquid crystal layer LCL may change, according to the electric field applied to the liquid crystal layer LCL. In this case, the change of the elastic energy density may be generated when the liquid crystal is sprayed, twisted, and/or bent. An elastic constant is respectively referred to as spraying modulus of elasticity (K11), twist elastic constant (K22), and bending modulus of elasticity (K33).

The liquid crystal layer LCL may have the value of rotation viscosity ($\gamma$1)/bending modulus of elasticity (K33) in the range of about 6.0 to about 6.4 mPa*s/pN. When the value of rotation viscosity ($\gamma$1)/bending modulus of elasticity (K33) is less than about 6.0 to mPa*s/pN, visibility may be deteriorated, and the reliability of liquid crystal may be lowered. When the value of rotation viscosity ($\gamma$1)/bending modulus of elasticity (K33) exceeds about 6.4 mPa*s/pN, response times may be slow, and rapid response times may not be attained. When the value of rotation viscosity ($\gamma$1)/bending modulus of elasticity (K33) is within the above-described range, the response time of the liquid crystal may be improved, and the contrast ratio of the liquid crystal may be improved.

The liquid crystal layer LCL may have the spraying modulus of elasticity (K11) of about 12.0 to about 15.0 pN. When the spraying modulus of elasticity (K11) is less than about 12.0 pN, response time may not be improved. When the spraying modulus of elasticity (K11) exceeds about 15.0 pN, visibility may be deteriorated.

The liquid crystal layer LCL uses refractive index anisotropy to express images. The liquid crystal layer LCL may have an refractive index anisotropy of about 0.106 to about 0.110, at about 30° C. When the refractive index anisotropy at about 30° C. is less than about 0.106, response times may not increase. When the refractive index anisotropy exceeds about 0.110, visibility may be deteriorated.

The dielectric anisotropy of the liquid crystal layer LCL allows for the electrical control of the alignment of the liquid crystal. The liquid crystal LCL may have the dielectric anisotropy of from about −3.2 to about −2.8 at about 30° C. When the dielectric anisotropy at about 30° C. is less than about −3.2, the transmittance of the liquid crystal may be deteriorated. When the dielectric anisotropy exceeds about −2.8, response time may be delayed.

The light provided to the liquid crystal layer LCL and the light transmitted through the liquid crystal layer LCL may have a phase difference of about 310 nm to about 350 nm. When the phase difference is less than about 310 nm, response times may not increase. When the phase difference exceeds about 350 nm, visibility may be reduced.

The cell gap between the first substrate SUB1 and the second substrate SUB2 may be about 3.0 μm. When the cell gap between the first substrate SUB1 and the second substrate SUB2 is about 3.2 μm, the value of rotation viscosity (γ1)/bending modulus of elasticity (K33) may be from about 5.3 to about 5.7 mPa*s/pN.

When the value of rotation viscosity (γ1)/bending modulus of elasticity (K33) is less than about 5.3 mPa*s/pN, visibility may be reduced, and the reliability of the liquid crystal may be reduced. When the value of rotation viscosity (γ1)/bending modulus of elasticity (K33) exceeds about 5.7 mPa*s/pN, response times may become slow, and rapid response times may not be attained. When the value of rotation viscosity (γ1)/bending modulus of elasticity (K33) is within the above-described range, the response time of the liquid crystal may be reduced, and the contrast ratio of the liquid crystal may be improved.

The liquid crystal layer LCL may include alkenyl-based liquid crystal molecules, alkoxy-based liquid crystal molecules, and/or quaterphenyl-based liquid crystal molecules. The alkenyl-based liquid crystal molecules and the alkoxy-based liquid crystal molecules are liquid crystal molecules having a relatively lower viscosity, which may improve response times.

The alkenyl-based liquid crystal molecules may include the compounds of the following Formula 1 and Formula 2.

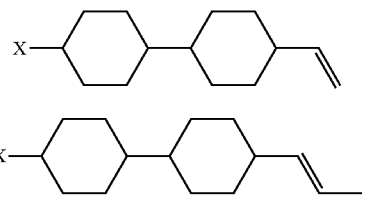

[Formula 1]

[Formula 2]

In Formulas 1 and 2, X is independently hydrogen or an alkyl group having 1 to 7 carbon atoms.

The liquid crystal layer LCL may include from about 25 to about 30 parts by weight of the compound of Formula 1 and from about 8 to about 25 parts by weight of the compound of Formula 2, based on 100 parts by weight of the liquid crystal layer LCL. When the amount of the compound of Formula 1 is less than about 25 parts by weight, the viscosity of the liquid crystal layer LCL may be increased, and the response time of the liquid crystal layer LCL may be reduced. When the amount of the compound of Formula 1 exceeds about 30 parts by weight, a large amount of polar by-products obtained through the reaction with a polar material may be produced. In the case when the amount of the polar by-products is large, the reaction of the reactive mesogen may be delayed. Detailed description on the by-products and the reaction delay of the reactive mesogen will be explained when explaining a method of manufacturing a display device according to an embodiment of the inventive concept.

In addition, when the amount of the compound of Formula 2 is less than about 8 parts by weight, the viscosity of the liquid crystal layer LCL may be increased, which may increase of the response time of the liquid crystal layer LCL When the amount of the compound of Formula 2 exceeds about 13 parts by weight, a large amount of polar by-products obtained through the reaction with a polar material may be produced. In the case when the amount of the polar by-products is large, the reaction of the reactive mesogen may be delayed.

The alkoxy-based liquid crystal molecules may include first alkoxy-based liquid crystal molecules including the compounds of the following Formula 3 and Formula 4.

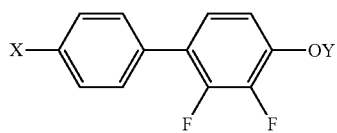

[Formula 3]

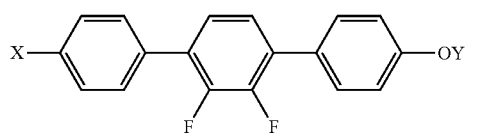

[Formula 4]

In Formulas 3 and 4, X and Y are independently hydrogen or an alkyl group having 1 to 7 carbon atoms.

The liquid crystal layer LCL may include from about 18 to about 23 parts by weight of the compound of Formula 3 and from about 8 to about 13 parts by weight of the compound of Formula 4, based on 100 parts by weight of the liquid crystal layer LCL.

When the amount of the compound of Formula 3 is less than about 18 parts by weight, the viscosity of the liquid crystal layer LCL may be increased, which may increase the response time of the liquid crystal layer LCL. When the amount exceeds about 23 parts by weight, the transformation of the alkoxy-based liquid crystal may be increased, according to the increase of exposure time during the exposure of the liquid crystal layer LCL, and a voltage holding ratio may be decreased, thereby generating line afterimages.

When the amount of the compound of Formula 4 is less than about 8 parts by weight, the viscosity and response time of the liquid crystal layer LCL may be increased. When the amount exceeds about 13 parts by weight, the transformation of the alkoxy-based liquid crystal may be increased according to the increase of exposing time during the exposure of the liquid crystal layer LCL, and a voltage holding ratio may be decreased, thereby generating line afterimages.

The alkoxy-based liquid crystal molecules may further include second alkoxy-based liquid crystal molecules including at least one of the compounds represented by the following Formula 5 and Formula 6.

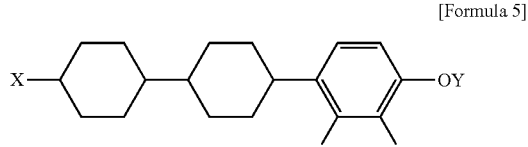

[Formula 5]

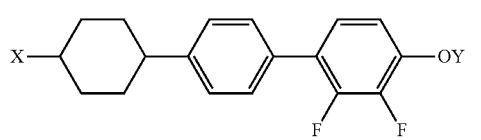

[Formula 6]

In Formulas 5 and 6, X and Y are independently hydrogen or an alkyl group having 1 to 7 carbon atoms.

The liquid crystal layer LCL may include from about 15 to about 20 parts by weight of the second alkoxy-based liquid crystal, based on 100 parts by weight of the liquid crystal layer LCL.

When the amount of the second alkoxy-based liquid crystal is less than about 15 parts by weight, the viscosity and response time of the liquid crystal layer LCL may be increased. When the amount exceeds about 20 parts by weight, the transformation of the alkoxy-based liquid crystal may be increased according to the increase of exposing time during the exposure of the liquid crystal layer LCL, and a voltage holding ratio may be decreased, thereby generating line afterimages.

The quaterphenyl-based liquid crystal molecule may include the compound of the following Formula 7.

[Formula 7]

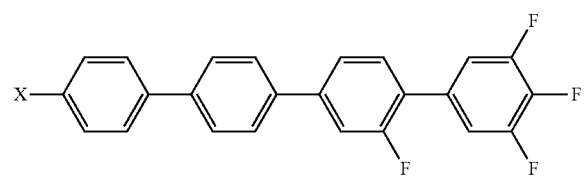

In Formula 7, X is independently hydrogen or an alkyl group having 1 to 7 carbon atoms.

The liquid crystal layer LCL may include from about 0.1 to about 1 part by weight of the compound of Formula 7, based on 100 parts by weight of the liquid crystal layer LCL. When the amount of the compound of Formula 7 is in the above-described range, the response time of the liquid crystal may be improved.

The first and second alignment layers ALN1 and ALN2 may respectively include a polymerized reactive mesogen. The reactive mesogen may be included in the first alignment forming layer PTL1. The reactive mesogen may be polymerized and partially cross-linked, and may petilt the liquid crystal molecules, so as to have a certain tilt angle with respect to one surface of the first substrate SUB1 and the second substrate SUB2.

The reactive mesogen may include the compound of the following Formula 8.

[Formula 8]

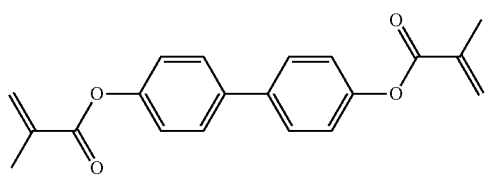

The liquid crystal layer may include about 0.4 to about 0.5 parts by weight of the compound of Formula 8, based on 100 parts by weight of the liquid crystal layer LCL. When the amount of the compound of Formula 8 is less than about 0.4 parts by weight, the polymerization reaction may be insufficient, and the formation of branched chains may be difficult. When the amount exceeds about 0.5 parts by weight, a voltage holding ratio may be decreased, and line afterimages may be generated.

The display device 10 according to an embodiment of the inventive concept may have various pixel structures. For example, two gate lines and one data line may be connected to one pixel, or one gate line and two data lines may be connected to one pixel. Alternatively, one pixel may include two sub-pixels to which two different voltages are applied. In this case, a high voltage may be applied to one sub-pixel, and a low voltage may be applied to the remaining sub-pixel. In addition, in an embodiment of the inventive concept, a structure including a pixel electrode having a plurality of minute slits and a common electrode formed as one plate is disclosed. However, the present teaching include other structures. For example, a domain dividing element to separate each of the pixels into a plurality of domains, such as a slit or an extrusion, may be provided with the pixel electrode and the common electrode.

The display device 10 according to an embodiment of the inventive concept may prevent the transformation of the liquid crystal. Thus, the decrease of the voltage holding ratio of the pixel may be prevented, and defects that may be possibly generated due to the transformation of the liquid crystal such as stains, line afterimages, plane afterimages, etc., may be decreased or prevented. In addition, the response time of the liquid crystal may be improved.

Hereinafter, a method of manufacturing a display device according an embodiment of the inventive concept will be described in detail. Hereinafter the explanation will be described mainly with the different features from the above-described display devices.

Figure 4:
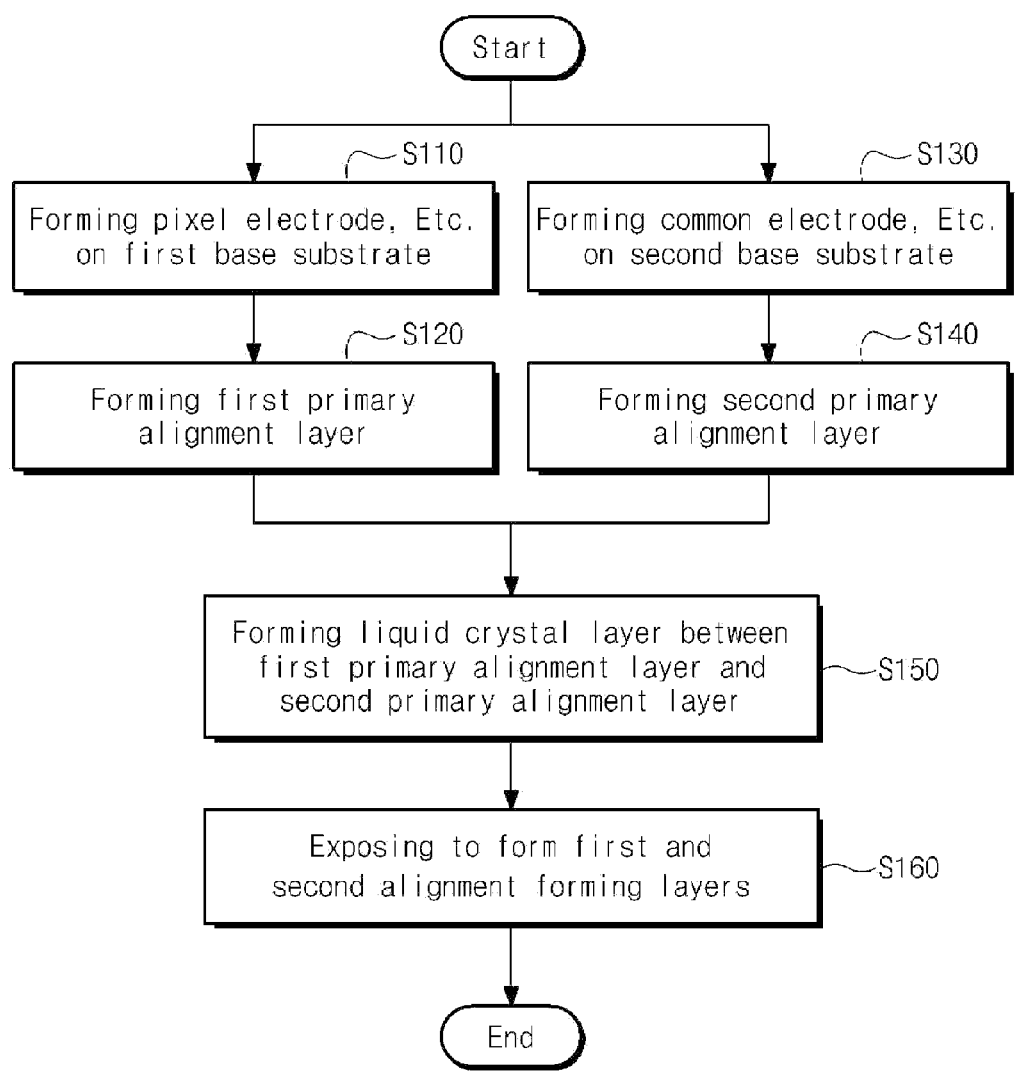
FIG. 4 is a flowchart illustrating a method of manufacturing a display device according to an embodiment of the inventive concept.

FIG. 4 is a flowchart illustrating a method of manufacturing a display device according to an embodiment of the inventive concept. Referring to FIG. 4, a pixel electrode, etc. is formed on a first base substrate (S110), and a first primary alignment layer is formed on the first base substrate (S120). Separately, a common electrode, etc. is formed on a second base substrate (S130), and a second primary alignment layer is formed on the second base substrate (S140). A liquid crystal layer is disposed between the first primary alignment layer and the second primary alignment layer (S150).

Figure 5A:
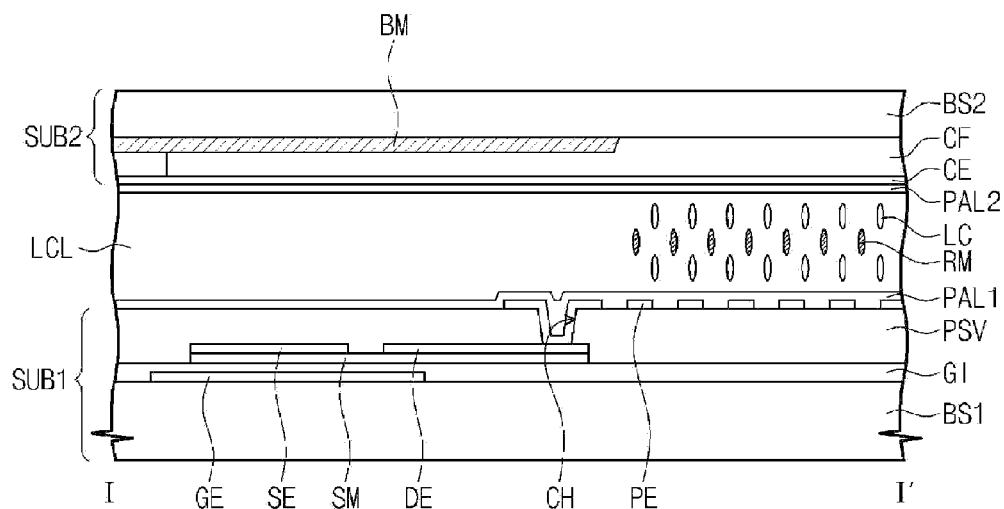
FIGS. 5A and 5B are cross-sectional views illustrating a method of aligning an alignment layer in an embodiment of the inventive concept.
Figure 5B:
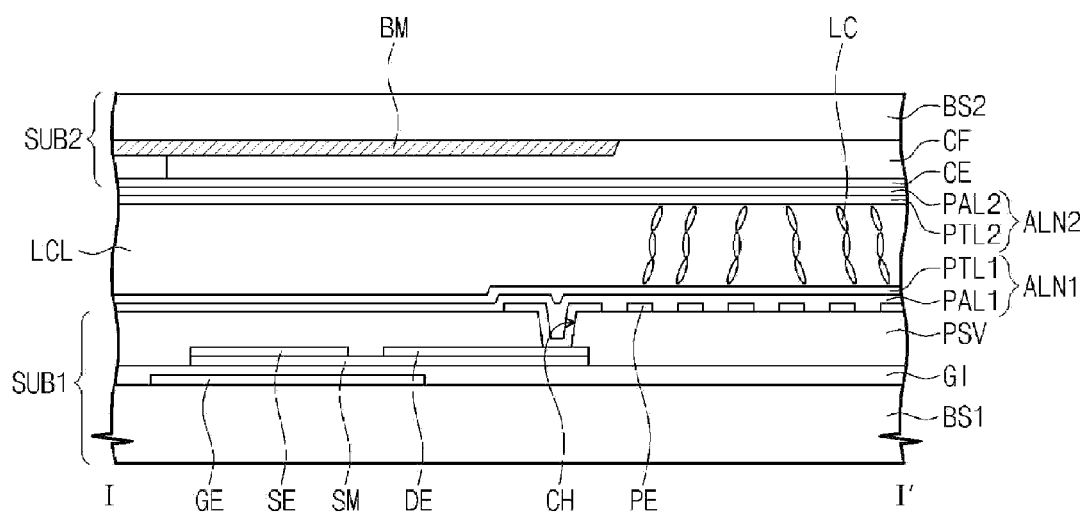

FIGS. 5A and 5B are cross-sectional views illustrating a method of aligning an alignment layer in an embodiment of the inventive concept. Referring to FIG. 5A, the liquid crystal layer LCL includes reactive mesogens RM and alkenyl-based, alkoxy-based, and quaterphenyl-based, liquid crystal molecules LC. Herein, the liquid crystal molecules are all generally designated by LC. The liquid crystal layer LCL is exposed to light such as ultraviolet light, to cure the reactive mesogen RM of the liquid crystal layer LCL, thereby forming a first alignment forming layer PTL1 and a second alignment forming layer PTL2 (S160).

Referring to FIGS. 1 to 4 and 5A, a gate pattern is formed on the first base substrate BS1. The gate pattern includes a gate line GLn and a storage electrode. The gate pattern may be formed by using a photolithography process.

A gate insulating layer GI is formed on the gate pattern. On the gate insulating layer GI, a semiconductor pattern SM is formed. The semiconductor pattern SM may include an active pattern and an ohmic contact layer formed on the active pattern. The semiconductor pattern SM may be formed by using a photolithography process.

A data pattern is formed on the semiconductor pattern SM. The data pattern includes the data line DLm, the source electrode SE, and the drain electrode DE. The data pattern may be formed by using a photolithography process. In this case, the semiconductor pattern SM and the data pattern may be formed by using one sheet of a half mask or a diffraction mask.

A passivation layer PSV is formed on the data pattern. The passivation layer PSV includes a contact hole CH exposing a portion of the drain electrode DE and may be formed by using a photolithography process.

On the passivation layer PSV, the pixel electrode PE connected to the drain electrode DE through the contact hole CH, is formed. The pixel electrode PE may be formed by using a photolithography process.

The first primary alignment layer PAL1 is formed on the first base substrate BS1 on which the pixel electrode PE, etc. is formed. The first primary alignment layer PAL1 may be formed by coating an alignment solution including a polymer LC such as polyimide, or the monomer of the polymer LC, on the first base substrate BS1, and heating the alignment solution.

A color filter CF is formed on the second base substrate BS2. On the color filter CF, a common electrode CE is formed. The color filter CF and the common electrode CE may be formed by various methods such as by a photolithography process.

The second primary alignment layer PAL2 is formed on the second base substrate BS2 on which the common electrode CE, etc. is formed. The second primary alignment layer PAL2 may be formed by coating a second alignment solution on the second substrate SUB2 and heating the second alignment solution. The second primary alignment layer PAL2 may include the same components as those included in the first primary alignment solution and may be formed by performing the same process as that for the first primary alignment layer PAL1.

After the first substrate SUB1 and the second substrate SUB2 are positioned to face one another, a liquid crystal layer LCL is disposed between the first substrate SUB1 and the second substrate SUB2. The liquid crystal layer LCL is formed by using a liquid crystal composition including reactive mesogens RM and alkenyl-based, alkoxy-based, and quaterphenyl-based, liquid crystal molecule LC.

The liquid crystal molecules LC and the reactive mesogen RM may be selected according to the desired characteristics of a display device.

Referring to FIG. 5B, ultraviolet light is applied to the liquid crystal layer LCL to cure the reactive mesogens RM. During applying the ultraviolet to the liquid crystal layer LCL to cure the reactive mesogen RM, an electric field may be applied to the liquid crystal layer LCL.

The reactive mesogens RM may be polymerized by the ultraviolet light and attached to the first primary alignment layer PAL1 and the second primary alignment layer PAL2, so as to form branched chains. Thus, the first alignment forming layer PTL1 is formed on the first primary alignment layer PAL1, and the second alignment forming layer PTL2 is formed on the second primary alignment layer PAL2. The first and second alignment forming layers PTL1 and PTL2 may pretilt the liquid crystal molecules LC.

More particularly, when an electric field is applied to the liquid crystal molecules LC, the reactive mesogen RM may be aligned in the substantially the same direction as the liquid crystal molecules LC surrounding the reactive mesogens RM. When the ultraviolet light is applied in this state, the reactive mesogens RM may polymerize, and a network between the reactive mesogens RM may be formed. The reactive mesogens RM may bond with neighboring reactive mesogens RM to form branched chains. Since the reactive mesogens RM form a network while the liquid crystal molecules LC are aligned, the network may have certain alignment properties according to the average alignment direction of liquid crystal molecules LC. Thus, the liquid crystal molecules LC adjacent to the network may remain pretilted when the electric field is removed.

A portion of the liquid crystal molecules LC may be transformed by an oxidation reaction during the ultraviolet exposure process. Radicals or ions may be formed from a photoinitiator, the reactive mesogens RM, the liquid crystal molecules LC, impurities in the liquid crystal layers LCL, etc. by the ultraviolet light. The radicals and ions react with surrounding liquid crystal molecules LC to produce byproducts. Particularly, the alkenyl-based liquid crystal molecules and the alkoxy-based liquid crystal molecules are relatively easily oxidized, with the alkenyl-based liquid crystal molecules being the easiest to oxidize. Since the oxidized liquid crystals are not driven normally when an electric field is applied, the voltage holding ratio of the pixel may be decreased, and defects such as stains or afterimages may be generated.

In the following Reactions 1 to 3, side reactions possibly performed with respect to the compound of Formula 1 are schematically illustrated. Z is a radical source, and R is hydrogen or an alkyl group having 1 to 7 carbon atoms. The major by-products of the following Reactions 1 to 3 are polar materials. The polar materials are known to induce the drop of a voltage holding ratio, together with defects such as stains, line afterimages, plane afterimages, etc.

[Reaction 1]

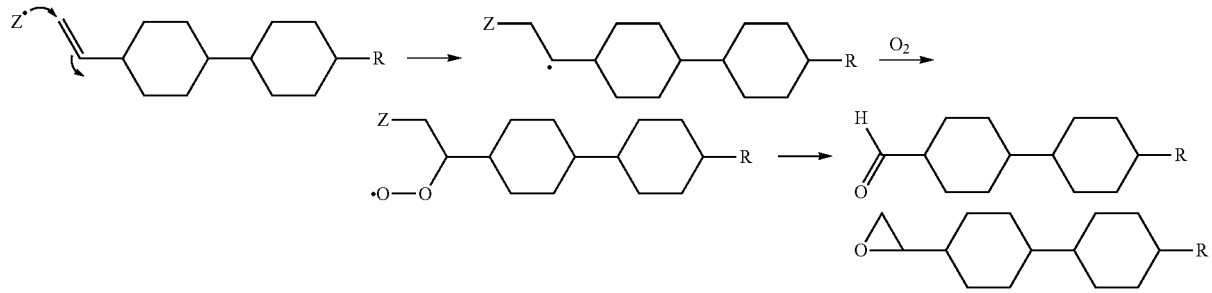

[Reaction 2]

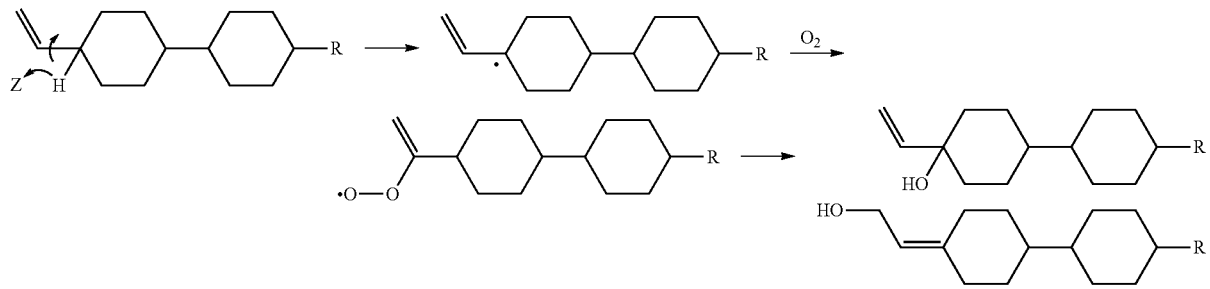

-continued
[Reaction 3]

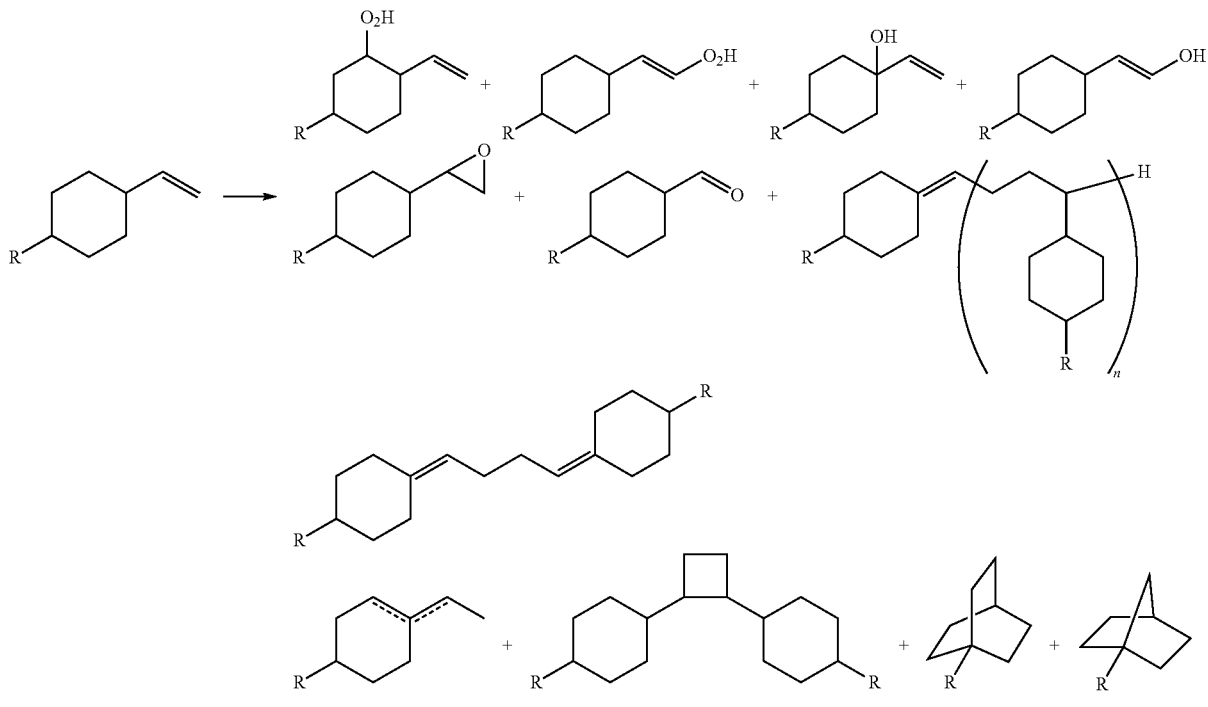

The following Reaction 4 schematically illustrates the polymerization reaction of the reactive mesogen RM. Here, W represents a radical source.

[Reaction 4]

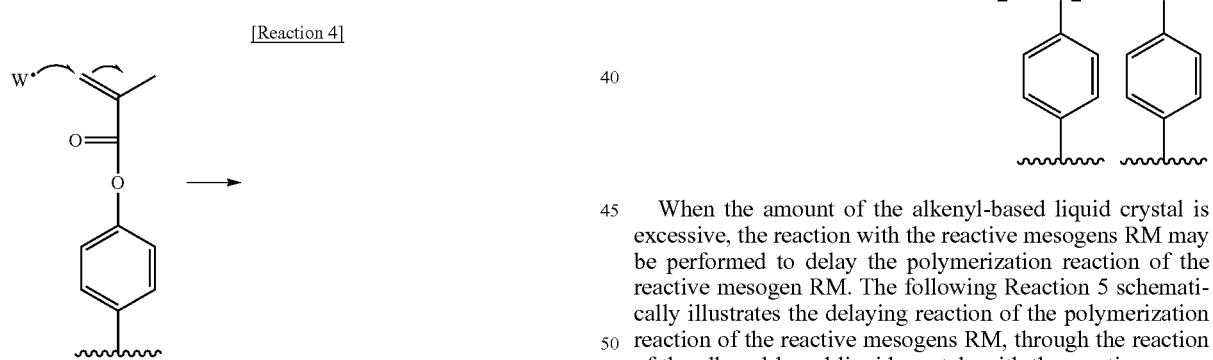

When the amount of the alkenyl-based liquid crystal is excessive, the reaction with the reactive mesogens RM may be performed to delay the polymerization reaction of the reactive mesogen RM. The following Reaction 5 schematically illustrates the delaying reaction of the polymerization reaction of the reactive mesogens RM, through the reaction of the alkenyl-based liquid crystals with the reactive mesogens RM. Here, W represents a radical source, and R is hydrogen or an alkyl group having 1 to 7 carbon atoms.

[Reaction 5]

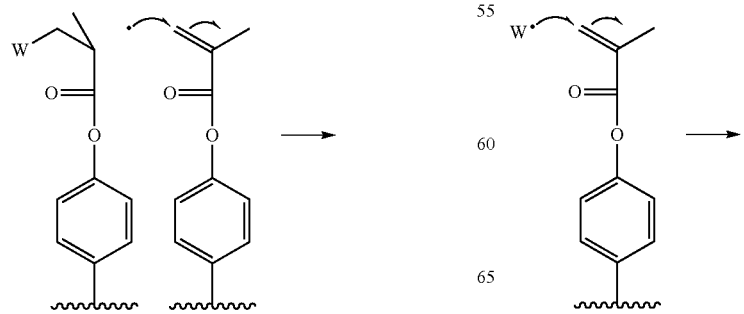

-continued

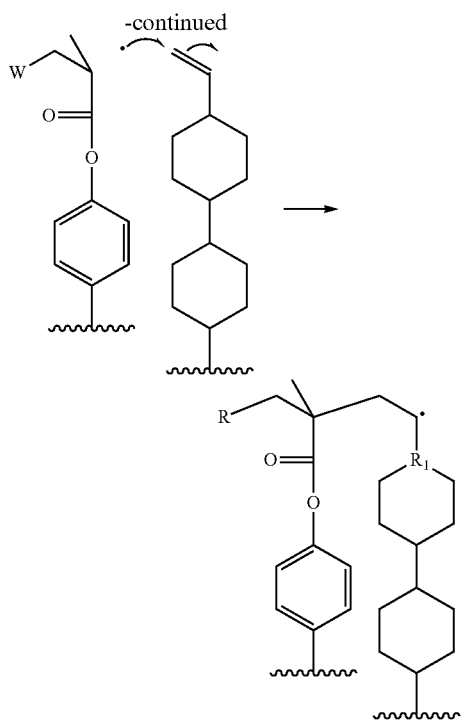

In the above embodiments, the generation of the radicals or the ions during the polymerization of the reactive mesogens RM due to the ultraviolet light is explained. However, radicals and ions may be generated from other sources. The radicals or the ions may be produced as by-products irrespective of the polymerization of the reactive mesogens RM and, for example, may be produced during heating for forming other elements.

The liquid crystal composition may have the value of rotation viscosity (γ1)/bending modulus of elasticity (K33) of about 6.0 to about 6.4 mPa*s/pN. The response time of the liquid crystal may be improved, and the transformation of the liquid crystal may be prevented. That is, the production of the by-products according to Reactions 1 to 3 may be decreased, and the polymerization shown in Reaction 5 may be unhindered. Thus, the decrease of the voltage holding ratio of a pixel may be prevented, and defects that may be possibly generated due to the transformation of the liquid crystal such as stains, line afterimages, plane afterimages, etc., may be decreased or prevented.

The cured reactive mesogens RM may be additionally cured after removing an electric field. Through the additional curing, reactive mesogens RM uncured during the curing process may be cured.

In liquid crystal display devices having the above-described structures and manufactured by the above-described methods, the transformation of liquid crystals may be prevented. Thus, the decrease of the voltage holding ratio of a pixel may be prevented, and defects that may be possibly generated due to the transformation of the liquid crystals be decreased or prevented.

The above-disclosed subject matter is to be considered illustrative and not restrictive, and the appended claims are intended to cover all such modifications, enhancements, and other embodiments, which fall within the true spirit and scope of the inventive concept. Thus, to the maximum extent allowed by law, the scope of the inventive concept is to be determined by the broadest permissible interpretation of the following claims and their equivalents, and shall not be restricted or limited by the foregoing detailed description.

What is claimed is:

1. A display device comprising:
   a first substrate;
   a second substrate facing the first substrate; and
   a liquid crystal layer disposed between the first substrate and the second substrate, the liquid crystal layer having a value of rotation viscosity (γ1)/bending modulus of elasticity (K33) of 6.0 to 6.4 mPa*s/pN and a dielectric anisotropy of −3.2 to −2.8 at 30° C.,
   wherein a cell gap disposed between the first substrate and the second substrate is about 3.0 μm.

2. The display device of claim 1, wherein the liquid crystal layer has a spraying modulus of elasticity (K11) of about 12.0 to about 15.0 pN.

3. The display device of claim 1, wherein the liquid crystal layer has refractive index anisotropy of about 0.106 to about 0.110, at about 30° C.

4. The display device of claim 1, wherein light provided to the liquid crystal layer and light transmitted through the liquid crystal layer have a phase difference of about 310 to about 350 nm.

5. The display device of claim 1, wherein the liquid crystal layer comprises a liquid crystal molecule comprising at least one of an alkenyl group, an alkoxy group, and a quarterphenyl group.

6. The display device of claim 5, wherein the liquid crystal layer comprises a first liquid crystal molecule represented by Formula 1 and a second liquid crystal molecule represented by Formula 2:

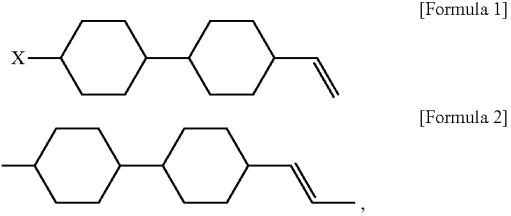

wherein, in Formulas 1 and 2, X is independently hydrogen or an alkyl group having 1 to 7 carbon atoms.

7. The display device of claim 6, wherein the liquid crystal layer comprises:
   about 25 to about 30 parts by weight of the compound of Formula 1, based on 100 parts by weight of the liquid crystal layer; and
   about 8 to about 13 parts by weight of the compound of Formula 2, based on 100 parts by weight of the liquid crystal layer.

8. The display device of claim 6, wherein the liquid crystal layer comprises a third liquid crystal molecule represented by Formula 3 and a fourth liquid crystal molecule represented by Formula 4:

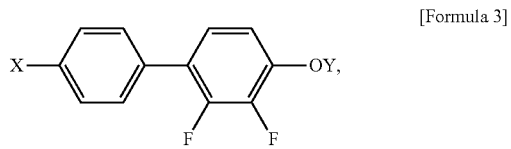

-continued

[Formula 4]

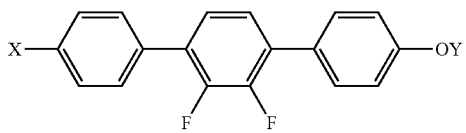

wherein, in Formulas 3 and 4, X and Y are independently hydrogen or an alkyl group having 1 to 7 carbon atoms.

9. The display device of claim 8, wherein the liquid crystal layer comprises:
about 18 to about 23 parts by weight of the compound of Formula 3, based on 100 parts by weight of the liquid crystal layer; and
about 8 to about 13 parts by weight of the compound of Formula 4, based on 100 parts by weight of the liquid crystal layer.

10. The display device of claim 8, wherein the liquid crystal layer comprises at least one of a fifth liquid crystal molecule represented by Formula 5 and a sixth liquid crystal molecule represented by Formula 6:

[Formula 5]

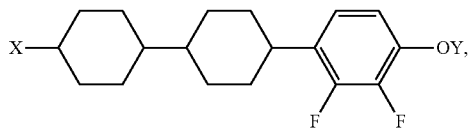

[Formula 6]

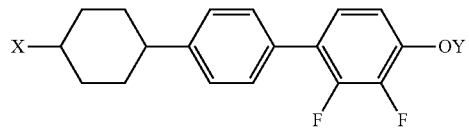

wherein, in Formulas 5 and 6, X and Y are independently hydrogen or an alkyl group having 1 to 7 carbon atoms.

11. The display device of claim 10, wherein the liquid crystal layer comprises:
about 15 to about 20 parts by weight of the at least one of the fifth liquid crystal molecule and the sixth liquid crystal molecule, based on 100 parts by weight of the liquid crystal layer.

12. The display device of claim 10, wherein the liquid crystal layer comprises a seventh liquid crystal molecule represented by Formula 7:

[Formula 7]

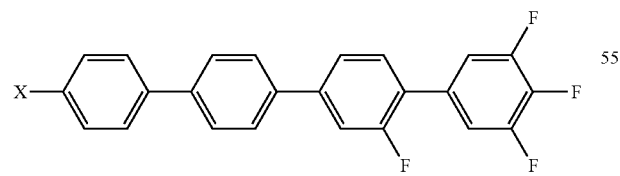

wherein, in Formula 7, X is independently hydrogen or an alkyl group having 1 to 7 carbon atoms.

13. The display device of claim 12, wherein the liquid crystal layer comprises about 0.1 to about 1 parts by weight of the seventh liquid crystal molecule, based on 100 parts by weight of the liquid crystal layer.

14. The display device of claim 1, further comprising:
a first alignment layer disposed between the first substrate and the liquid crystal layer; and
a second alignment layer disposed between the second substrate and the liquid crystal layer, wherein the first and second alignment layers each comprise reactive mesogens.

15. The display device of claim 14, wherein the liquid crystal layer comprises reactive mesogens that are represented by Formula 8:

[Formula 8]

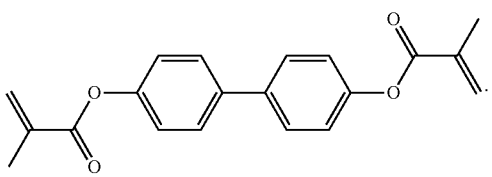

16. The display device of claim 15, wherein the liquid crystal layer comprises about 0.4 to about 0.5 parts by weight of the reactive mesogens of Formula 8, based on 100 parts by weight of the liquid crystal layer.

17. A method of manufacturing a display device, the method comprising:
forming a liquid crystal composition between a first substrate and a second substrate, the liquid crystal composition comprising a reactive mesogen and a molecule comprising at least one of an alkenyl group, alkoxy group, and a quarterphenyl group; and
forming alignment forming layers on the first substrate and the second substrate by irradiating the liquid crystal composition,
wherein the liquid crystal layer has a value of rotation viscosity ($\gamma 1$)/bending modulus of elasticity (K33) of 6.0 to 6.4 mPa*s/pN and a dielectric anisotropy of $-3.2$ to $-2.8$ at 30° C., and
wherein a cell gap disposed between the first substrate and the second substrate is about 3.0 μm.

18. A display device comprising:
a first substrate;
a second substrate facing the first substrate; and
a liquid crystal layer disposed between the first substrate and the second substrate, the liquid crystal layer having a value of rotation viscosity ($\gamma 1$)/bending modulus of elasticity (K33) of 5.3 to 5.7 mPa*s/pN and a dielectric anisotropy of $-3.2$ to $-2.8$ at 30° C.,
wherein a cell gap disposed between the first substrate and the second substrate is about 3.2 μm.

* * * * *